United States Patent
Chiang et al.

(10) Patent No.: US 9,933,958 B2
(45) Date of Patent: Apr. 3, 2018

(54) DATA STORAGE DEVICE AND DATA MAINTENANCE METHOD THEREOF

(71) Applicant: Silicon Motion, Inc., Jhubei (TW)

(72) Inventors: Chang-Hao Chiang, Zhubei (TW); Kuo-Tung Huang, Gongguan Township (TW); Yueh-Hsien Li, Hsinchu (TW); De-Wei Lai, Hsinchu (TW)

(73) Assignee: Silicon Motion, Inc., Jhubei (TW)

( * ) Notice: Subject to any disclaimer, the term of this patent is extended or adjusted under 35 U.S.C. 154(b) by 0 days.

(21) Appl. No.: 15/210,495

(22) Filed: Jul. 14, 2016

(65) Prior Publication Data
US 2017/0017426 A1 Jan. 19, 2017

(30) Foreign Application Priority Data
Jul. 17, 2015 (TW) .............................. 104123194 A

(51) Int. Cl.
*G11C 11/34* (2006.01)
*G06F 3/06* (2006.01)

(52) U.S. Cl.
CPC ............ *G06F 3/0619* (2013.01); *G06F 3/064* (2013.01); *G06F 3/065* (2013.01); *G06F 3/0679* (2013.01); *G06F 3/0688* (2013.01)

(58) Field of Classification Search
None
See application file for complete search history.

(56) References Cited

U.S. PATENT DOCUMENTS

| | | | |
|---|---|---|---|
| 8,352,808 B2 | 1/2013 | Kim et al. | |
| 8,595,422 B2 | 11/2013 | Ruby et al. | |
| 8,751,729 B2 | 6/2014 | Mun et al. | |
| 9,268,531 B1* | 2/2016 | Woo | G11C 16/0466 |
| 2007/0300130 A1* | 12/2007 | Gorobets | G06F 11/1068 |
| | | | 714/766 |
| 2012/0290783 A1 | 11/2012 | Chung et al. | |
| 2013/0124781 A1 | 5/2013 | Sadashivappa | |
| 2013/0219247 A1* | 8/2013 | Yang | G06F 11/1048 |
| | | | 714/766 |
| 2014/0195725 A1* | 7/2014 | Bennett | G06F 12/0246 |
| | | | 711/103 |
| 2015/0095550 A1 | 4/2015 | Khan et al. | |

FOREIGN PATENT DOCUMENTS

| | | |
|---|---|---|
| TW | 201250582 A | 12/2012 |
| TW | I438778 B | 5/2014 |
| TW | I455136 B | 10/2014 |

* cited by examiner

*Primary Examiner* — Harry W Byrne
*Assistant Examiner* — Sultana Begum
(74) *Attorney, Agent, or Firm* — Wang Law Firm, Inc.

(57) ABSTRACT

A data storage device including a flash memory and a controller. The flash memory includes a plurality of blocks, and each of the blocks has a plurality of pages. The controller receives a write command which is arranged to write a plurality of data sectors into a plurality of first pages of a first block of the blocks, calculates an offset index according to a first erase count of the first block, retrieving a plurality of seeds from a random seed table according to the offset index, encodes the data sectors by using the retrieved seeds to obtain a plurality of encoded data sectors, and writes the encoded data sectors into the first pages.

24 Claims, 7 Drawing Sheets

DATA STORAGE DEVICE AND DATA MAINTENANCE METHOD THEREOF

CROSS REFERENCE TO RELATED APPLICATIONS

This Application claims priority of Taiwan Patent Application No. 104123194, filed on Jul. 17, 2015, the entirety of which is incorporated by reference herein.

BACKGROUND OF THE INVENTION

Field of the Invention

The present invention is related to a data maintenance method of memory device; in particular to a data maintenance method for encoding data.

Description of the Related Art

Flash memory is considered a non-volatile data-storage device, using electrical methods to erase and program itself. NAND Flash, for example, is often used in memory cards, USB flash devices, solid state devices, eMMCs, and other memory devices.

Flash memory such as NAND Flash uses a multiple-block structure to store data. Each block contains multiple pages, wherein the write unit of the flash memory is the page, and the erase unit of the flash memory is the block. The data stored in the flash memory may be damaged due to repeatedly accessing the same page or the same block. Therefore, a data maintenance method that can prevent the data stored in the flash memory from damage is needed.

BRIEF SUMMARY OF THE INVENTION

A detailed description is given in the following embodiments with reference to the accompanying drawings.

An exemplary embodiment provides a data storage device including a flash memory and a controller. The flash memory includes a plurality of blocks, and each of the blocks has a plurality of pages. The controller receives a write command which is arranged to write a plurality of data sectors into a plurality of first pages of a first block of the blocks, calculates an offset index according to a first erase count of the first block, retrieving a plurality of seeds from a random seed table according to the offset index, encodes the data sectors by using the retrieved seeds to obtain a plurality of encoded data sectors, and writes the encoded data sectors into the first pages.

Another exemplary embodiment provides a data storage device including a flash memory and a controller. The flash memory includes a plurality of blocks, and each of the blocks has a plurality of pages. The controller repeatedly writes a data sector into the pages of the blocks. When the controller performs a write operation on a first block of the blocks, the controller calculates an offset index according to the number of times that the first block has been erased, encodes the data sector to produce a plurality of encoded data sectors according to the offset index, and writes the encoded data sectors into the first pages of the first block.

Yet another exemplary embodiment provides a data maintenance method applied to a data storage device, wherein the data storage device has a plurality of blocks, each of the blocks has a plurality of pages. The data maintenance method including: receiving a write command which is arranged to write a plurality of data sectors into a plurality of first pages of a first block of the blocks; reading a first erase count of the first block to calculate an offset index according to the first erase count; retrieving a plurality of seeds from a random seed table according to the offset index for obtaining a plurality of encoded data sectors by using the retrieved seeds to encode the data sectors; and writing the encoded data sectors into the first pages.

Yet another exemplary embodiment provides a data maintenance method applied in a data storage device, wherein the data storage device has a plurality of blocks, and each of the blocks has a plurality of pages. The data maintenance method includes: receiving a write command which is arranged to repeatedly write a data sector into a plurality of first pages of a first block of the blocks; reading a first erase count of the first block in response to the write command to obtain the number of times that the first block has been erased; calculating an offset index according to the number of times that the first has been erased; encoding the data sector according to the offset index to produce a plurality of encoded data sectors; and writing the encoded data sectors into the first pages of the first block, sequentially.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
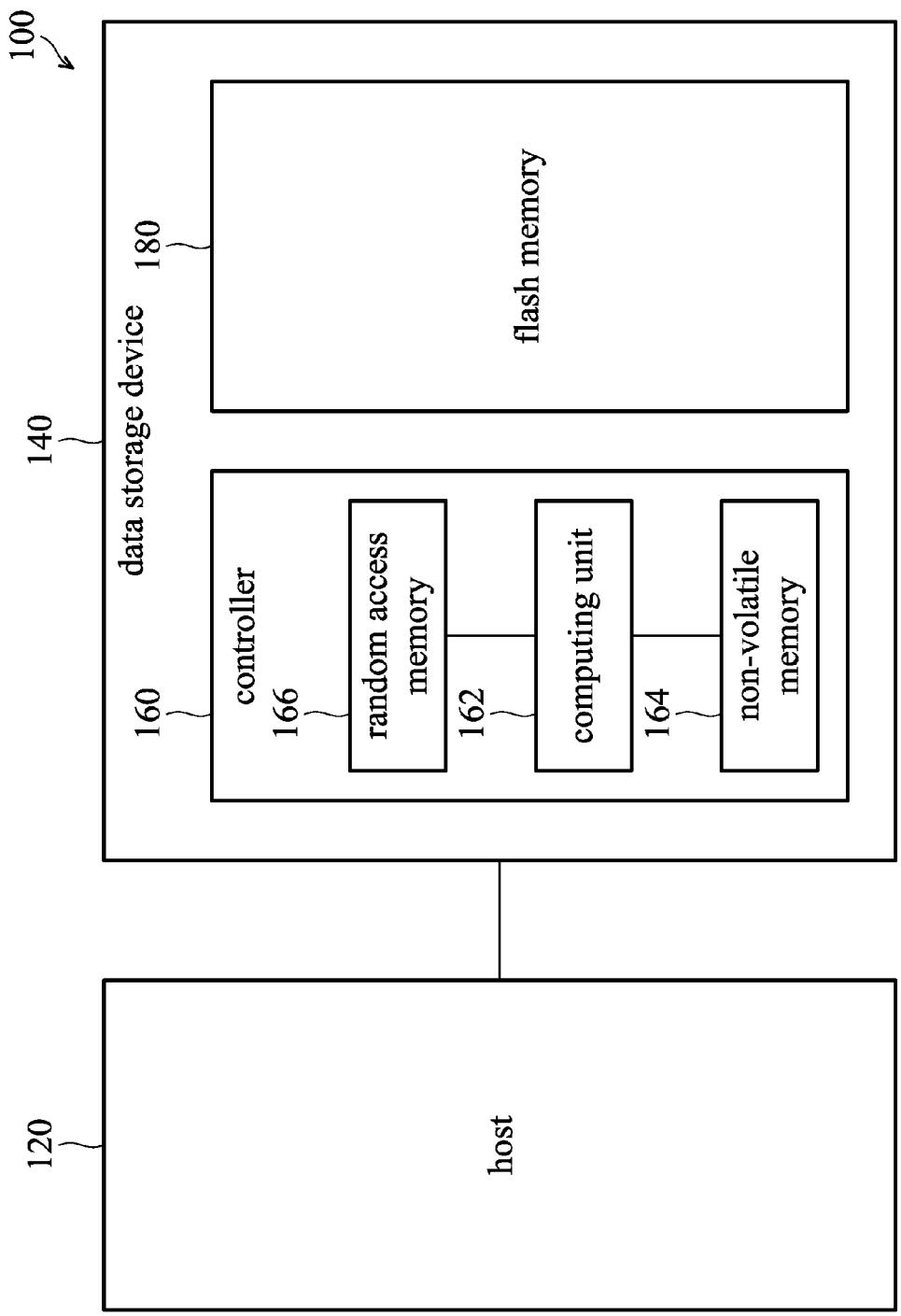
FIG. 1 is a schematic diagram illustrating an electronic system, constructed in accordance with some embodiments.

FIG. 1 is a schematic diagram illustrating an electronic system, constructed in accordance with some embodiments. The electronic system 100 includes a host 120 and a data storage device 140. The data storage device 140 includes a flash memory 180 and a controller 160, and operates in response to the commands of the host 120.

The controller 160 includes a computing unit 162, a non-volatile memory 164 (ROM) and a random access memory 166 (RAM). The non-volatile memory 164, the program code stored in the non-volatile memory 164 and data stored in the non-volatile memory 164 constitute firmware executed by the processing unit 162, and the controller 160 is configured to control the flash memory 180 based on the firmware.

Figure 2:
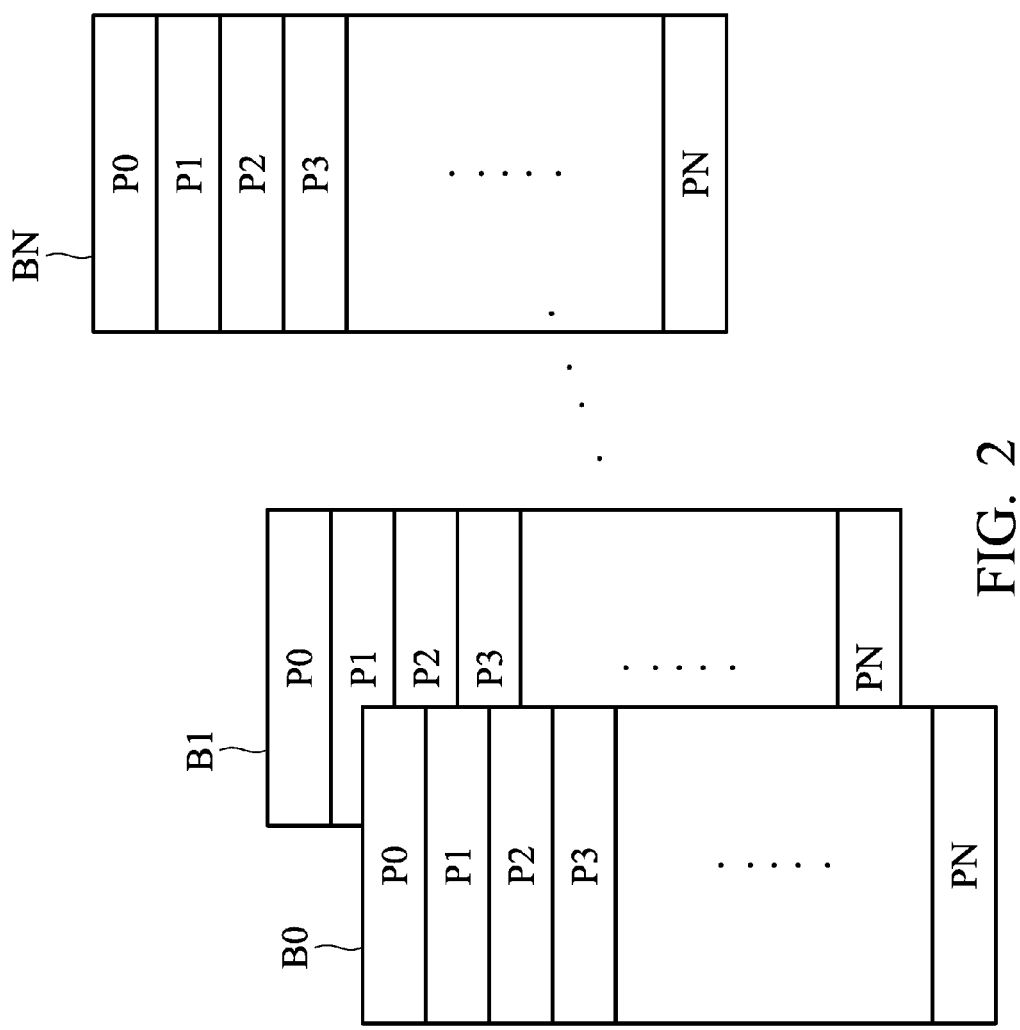
FIG. 2 is a schematic diagram illustrating a flash memory, constructed in accordance with some embodiments.

The flash memory 180 includes a plurality of blocks B0~BN, each of the blocks B0~BN includes a plurality of pages P0~PN, as shown in FIG. 2. It should be noted that the write unit of the flash memory 180 is page, and the erase unit of the flash memory 180 is block. In one of the embodiments, the controller 160 records the number of times that each of the blocks B0~BN has been erased. Namely, the flash memory 180 or the non-volatile memory 164 has an erase count table arranged to record the number of times that each of the blocks B0~BN has been erased since the flash memory 180 has been used, but it is not limited thereto. In other embodiments, the erase counts of the blocks B0~BN can be stored in the corresponding blocks B0~BN. Moreover, the flash memory 180 further includes a random seed table RST, as shown in FIG. 3.

Figure 3:
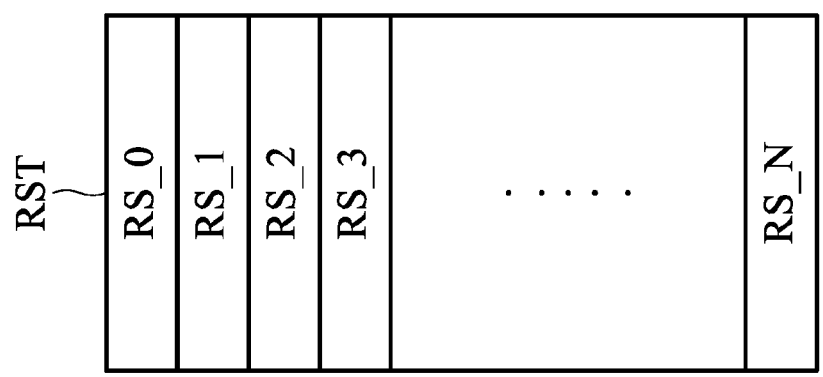
FIG. 3 is a schematic diagram illustrating a random seed table, constructed in accordance with some embodiments.

FIG. 3 is a schematic diagram illustrating a random seed table, constructed in accordance with some embodiments. The random seed table RST includes a plurality of seeds RS_0~RS_N, wherein the seeds RS_0~RS_N are arranged in a predetermined order in the random seed table RST, as shown in FIG. 3. Namely, the seeds RS_0~RS_N are stored in the random seed table RST in the predetermined order. The random seed table RST is arranged to provide the seeds RS_0~RS_N for the controller 160, such that the controller 160 can encode data by using different seeds to produce different encoded data. In one embodiment, the number of the seeds RS_0~RS_N is equal to the number of the pages P0~PN in each of the blocks, but it is not limited thereto. In other embodiments, the number of the seeds RS_0~RS_N can be more (or less) than the number of the pages P0~PN in each of the blocks. In some embodiments, one block can have 128 pages, but it is not limited thereto. The different type flash memories have different numbers of pages and blocks.

In some embodiments, the controller 160 is required to write the same data into the pages. However, the page of the flash memory 180 may be damaged when the page has been written onto too many times or the same data is written to the adjacent page. Therefore, the controller 160 scrambles the data which is arranged to be repeatedly written into the pages by using the seeds RS_0~RS_N of the random seed table RST to prevent the pages to be damaged.

More specifically, when the controller 160 receives a write command arranged to write a plurality of data sectors separately into a plurality of first pages of a first block, the controller 160 calculates an offset index according to a first erase count of the first block. Next, the controller 160 sequentially retrieves a plurality of seeds RS_0~RS_N from the random seed table RST according to the offset index, and uses the retrieved seeds to encode the data sectors to obtain a plurality of encoded data sectors. Lastly, the controller 160 writes the encoded data sectors into the first pages. It should be noted that, in this embodiment, the data sectors can be different from each other, or the data sectors can be the same.

In one of the embodiments, the controller 160 performs a hash algorithm by using the first erase count to obtain the offset index, wherein the divisor of the hash algorithm is the number of the pages in each of the blocks, but it is not limited thereto. In other embodiments, the controller 160 can also perform other algorithms by using the first erase count to obtain the offset index. Next, the controller 160 further selects one of the seeds RS_0~RS_N from the random seed table RST according to the offset index, and serves the selected seed as a target seed. Next, the controller 160 retrieves the seeds RS_0~RS_N sequentially in the predetermined order starting from the target seed to sequentially use the retrieved seed to encode the data sector, and one data sector is arranged to be stored in one first page. Moreover, in one of the embodiments, the data sectors are the same while the seeds RS_0~RS_N are different from each other and the encoded data sectors are also different from each other.

Namely, in the embodiment of the same data sectors, the controller 160 is arranged to repeatedly write the data sector into the pages of the blocks. For example, in the performance testing of the flash memory 180, the controller 160 is usually required to repeatedly write the same data into the flash memory 180, and erase the data to continue to write the same data into the flash memory 180 when the flash memory 180 is full. Therefore, in the above condition, the adjacent pages of the blocks and the blocks have been repeatedly overwritten with the same data are easily damaged. In one of the embodiments, the controller 160 can scramble the data arranged to be repeatedly written into the flash memory 180 by using the seeds RS_0~RS_N of the random seed table RST to protect the flash memory 180.

More specifically, when the controller 160 is required to write a first block of the blocks, the controller 160 calculates an offset index according to the number of times that the first block has been erased (the first erase count). Next, the controller 160 encodes the data sector according to the offset index to produce a plurality of encoded data sectors, and sequentially writes the encoded data sectors into a plurality of first page of the first block. As described above, the controller 160 performs the hash algorithm on the first erase count to obtain the offset index, wherein the divisor of the hash algorithm is the number of pages in each of the blocks, but it is not limited thereto. Moreover, the controller 160 locates a target seed from the seeds of the random seed table RST according to the offset index to use the seeds to encode the data sector. In one of the embodiments, the controller 160 retrieves the seeds RS_0~RS_N starting from the target seed in the predetermined order to sequentially use the retrieved seed to encode the data sector, wherein each of the seeds RS_0~RS_N is arranged to encode the data sector once to obtain an encoded data sector, such that the encoded data sectors are different from each other, and one first page stores one encoded data sector.

Moreover, when the controller 160 performs a write operation on the first block again, the first erase count of the first block will be greater than the previous write operation. Therefore, when the same data is repeatedly written to the first block, the controller 160 will obtain on offset index which is different from the previous write operation of the first block due to the increased first erase count. Therefore, the controller 160 retrieves the seeds RS_0~RS_N from the random seed table RST starting from the different seed according to the current offset index. Namely, the encoded data sectors written into the pages will be different from the previous write operation.

Figure 4:
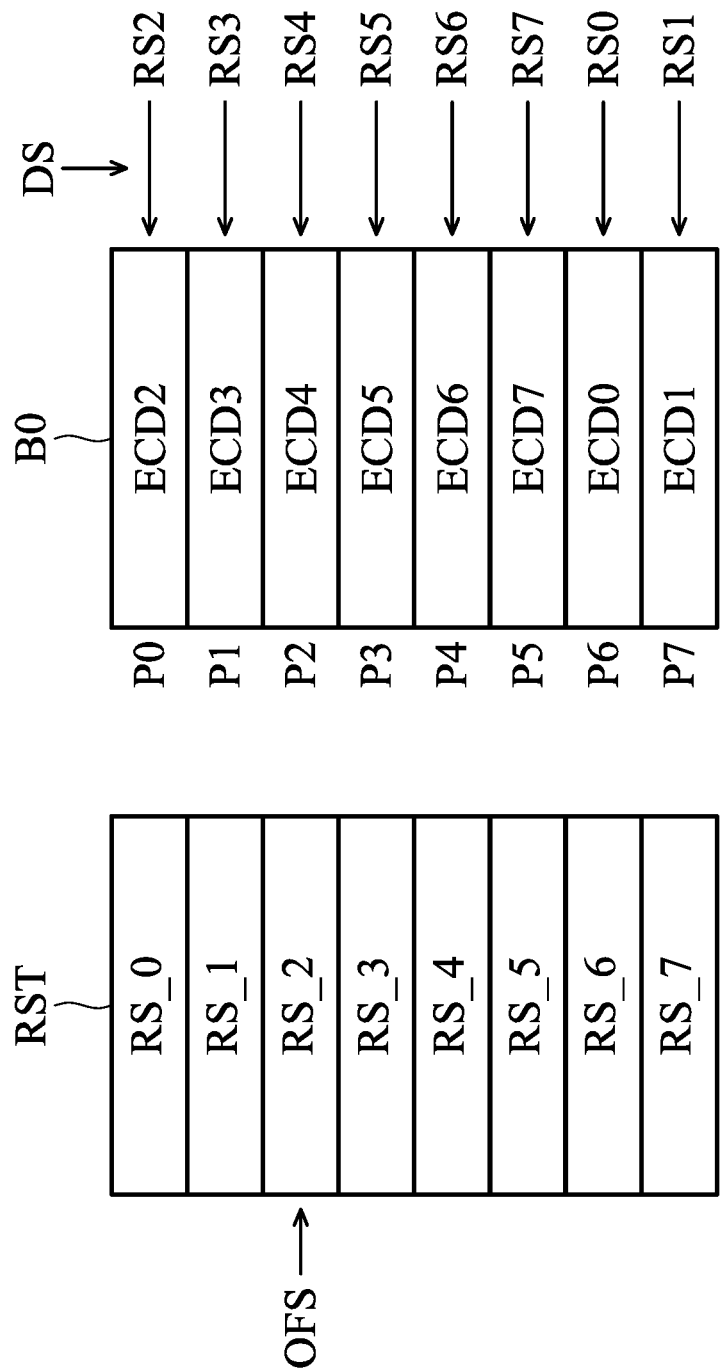
FIG. 4 is a schematic diagram illustrating the operation of selecting seeds, constructed in accordance with some embodiments.

FIG. 4 is a schematic diagram illustrating the operation of selecting seeds, constructed in accordance with some embodiments. For example, as shown in FIG. 4, each of the blocks B0~BN of the flash memory 180 has eight pages P0~P7, and the random seed table RST has eight seeds RS0~RS7 arranged in the predetermined order. When the controller 160 performs a write operation on the block B0, the controller 160 calculates an offset index according to the number of times that the block B0 has been erased (the erase count of the block B0). If the erase count of the block B0 is 2 and the divisor of the hash algorithm is 8, the controller 160 divides 8 by 2 by the hash algorithm to obtain a remainder of "2", and serves the remainder of "2" as the offset index OFS. Next, the controller 160 locates the seed RS2 of the random seed table RST according to the offset index OFS to take the seed RS2 as the target seed. Next, the controller 160 retrieves the seed RS2 to encode the data sector DS, and writes the encoded data sectors ECD2 produced by the seed RS2 and data sector DS into the page P0 of the block B0. Next, the controller 160 retrieves the next seed RS3 based on the predetermined order in which the seeds RS0~RS7 are arranged, and the controller 160 uses the seed RS3 to encode the data sector DS again, and writes the encoded data sectors ECD3 produced by the seed RS3 and data sector DS into the page P1 of the block B0. Next, the controller 160 retrieves the next seed RS4 based on the predetermined order in which the seeds RS0~RS7 are arranged, and the controller 160 uses the seeds RS4 to encode the data sector DS again, and writes the encoded data sectors ECD4 produced by the seed RS4 and data sector DS into the page P2 of the block B0, and so on, until the controller 160 uses the last seed RS7 of the random seed table RST to encode the data sector DS and writes the encoded data sectors ECD7 produced by the seed RS7 and data sector DS into the page P5 of the B0. Next, the controller 160 continues to retrieve the first seed RS0 of the random seed table RST to encode the data sector DS, and write the encoded data sectors ECD0 produced by the seed RS0 and data sector DS into the page P6 of the block B0. Next, the controller 160 repeatedly performs the above operations until all of the pages of the block B0 are written with the encoded data sector. It should be noted that the encoded data sectors ECD0~ECD7 are different from each other, because the encoded data sectors ECD0~ECD7 are encoded by different seeds RS0~RS7.

Figure 5:
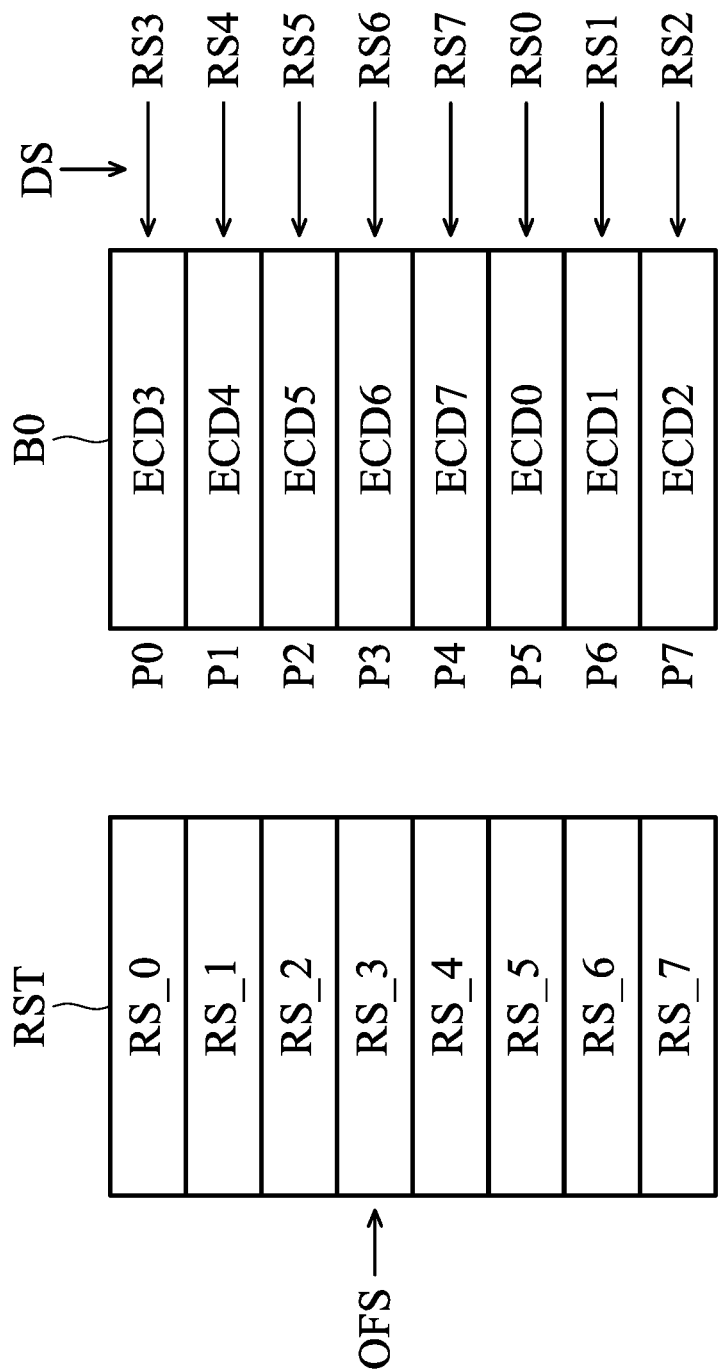
FIG. 5 is a schematic diagram illustrating another operation of selecting seeds, constructed in accordance with some embodiments.

When the controller 160 has performed the write operation on all of the pages of the block B0, the controller 160 may continue to perform a write operation on the other blocks using the above steps, but it is not limited thereto. The block B0 may be erased and re-assigned as a spare block by the controller 160 due to the memory space shortage, host commands or data maintenance. It should be noted that, when the block B0 is erased, the controller 160 increases the erase count of the block B0 by one. Therefore, the controller 160 obtains the different offset indexes by the different erase counts when the controller 160 is required to perform write operation on the block B0 again. As shown in FIG. 5, each of the blocks B0~BN of the flash memory 180 has eight pages P0~P7, and the random seed table RST has eight seeds RS0~RS7 arranged in the predetermined order. When the controller 160 is required to perform write operation on the block B0 again, the controller 160 calculates the offset index according to the current number of times that the block B0 has been erased. In this embodiment, the erase count of the block B0 has been increased to 3. Therefore, the controller 160 divides 8 by 3 by using the hash algorithm to obtain a remainder of "3", and takes the remainder of "3" as the offset index OFS. Next, the controller 160 locates the seed RS3 from the random seed table RST according to the offset index OFS, and serves the seed RS3 as the target seed. Next, the controller 160 retrieves the seed RS3 to encode the data sector DS, and writes the encoded data sectors ECD3 produced by the data sector DS and the seed RS3 into the page P0 of the block B0. Next, the controller 160 retrieves the next seed RS4 based on the predetermined order in which the seeds RS0~RS7 are arranged, encodes the data sector DS by using the seed RS4, and writes the encoded data sectors ECD4 produced by the data sector DS and the seed RS4 into the page P1 of the block B0. Next, the controller 160 retrieves the next seed RS5 based on the predetermined order in which the seeds RS0~RS7 are arranged, encodes the data sector DS by using the seed RS5, and writes the encoded data sectors ECD5 produced by the data sector DS and the seed RS5 into the page P2 of the block B0, and so on, until the controller 160 uses the last seed RS7 of the random seed table RST to encode the data sector DS and writes the encoded data sectors ECD7 produced by the data sector DS and the seed RS7 into the page P4 of the block B0. Next, the controller 160 retrieves the first seed RS0 of the random seed table RST to encode the data sector DS and writes the encoded data sectors ECD0 produced by the data sector DS and the seed RS0 into the page P5 of the block B0. Next, the controller 160 repeats the above steps until all of the pages in the block B0 are written with the encoded data sector. Comparing FIG. 4 and FIG. 5, it can be seen that the data written into the same page are different when the offset indexes are different. Namely, this can prevent the same data being written into the same page, because the offset index is determined by the erase count. It should be noted that, in other embodiments, the data sectors arranged to be written could be different from each other. As described above, the different data sectors can be scrambled for storing the irregular data or for data security.

Figure 6:
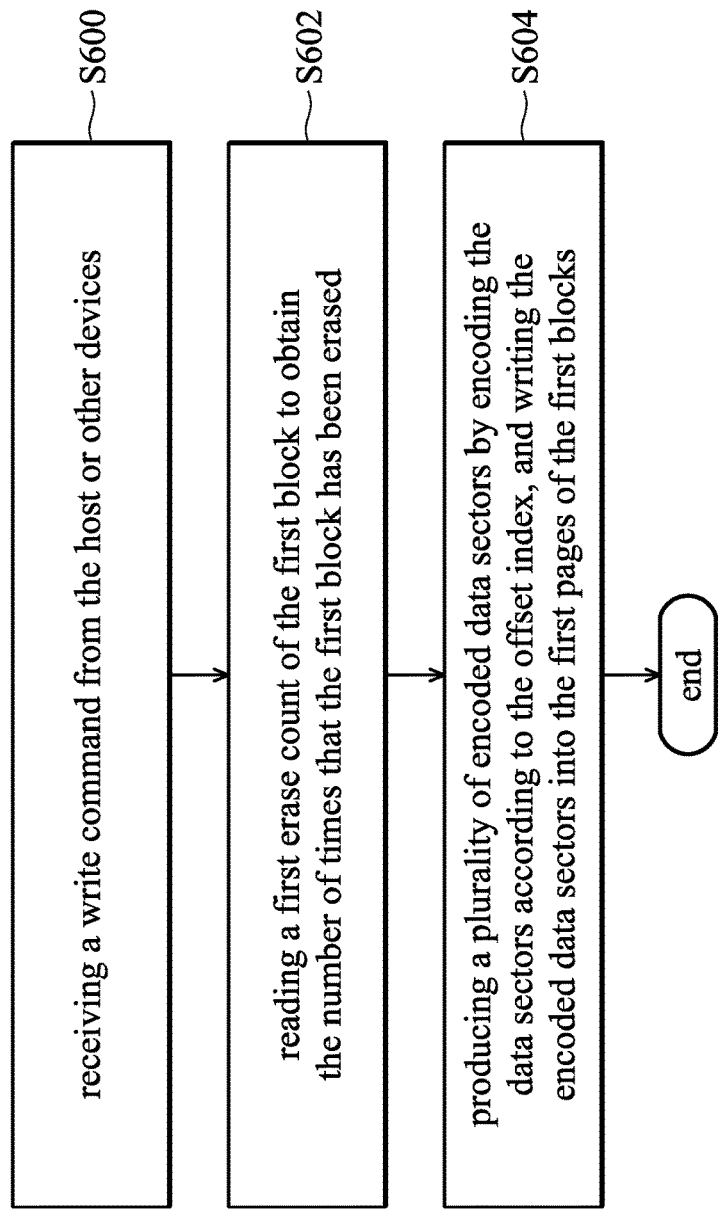
FIG. 6 is a flowchart of a data maintenance method constructed in accordance with some embodiments.

FIG. 6 is a flowchart of a data maintenance method constructed in accordance with some embodiments. The data maintenance method is applied to the data storage device 140 of FIG. 1. The process starts at step S600.

In step S600, the controller 160 receives a write command from the host 120 or other devices, wherein the write command is arranged to write a plurality of data sectors into a plurality of first pages of a first block. It should be noted that, in this embodiment, the data sectors are the same, but it is not limited thereto. In other embodiments, the data sectors can be different from each other. Namely, in the embodiment of the same data sector, the controller 160 receives a write command arranged to write a data sector into the first pages of the first block.

Next, in step S602, the controller 160 reads a first erase count of the first block to obtain the number of times that the first block has been erased, and calculates an offset index according to the first erase count. Namely, the flash memory 180 or the non-volatile memory 164 has an erase count table arranged to record the number of times that each of the blocks B0~BN has been erased since the flash memory 180 has been used, but it is not limited thereto. In other embodiments, the erase counts of the blocks B0~BN can be stored in the corresponding blocks B0~BN. In one of the embodiments, the controller 160 is arranged to perform a hash algorithm on the first erase count to obtain the offset index, wherein the divisor of the hash algorithm is the number of the pages in each of the blocks. Taking FIG. 4 as an example, each of the blocks B0~BN of the flash memory 180 has eight pages P0~P7, and the random seed table RST has eight seeds RS0~RS7 arranged in the predetermined order. When the controller 160 performs a write operation on the block B0, the controller 160 calculates an offset index according to the number of times that the block B0 has been erased (step S602). If the erase count of the block B0 is 2 and the divisor of the hash algorithm is 8, the controller 160 divides 8 by 2 by the hash algorithm to obtain a remainder of "2", and serves the remainder of "2" as the offset index OFS, but it is not limited thereto.

Next, in step S604, the controller 160 produces a plurality of encoded data sectors by encoding the data sectors according to the offset index, and writes the encoded data sectors into the first pages of the first blocks. The process ends at step S604.

Figure 7:
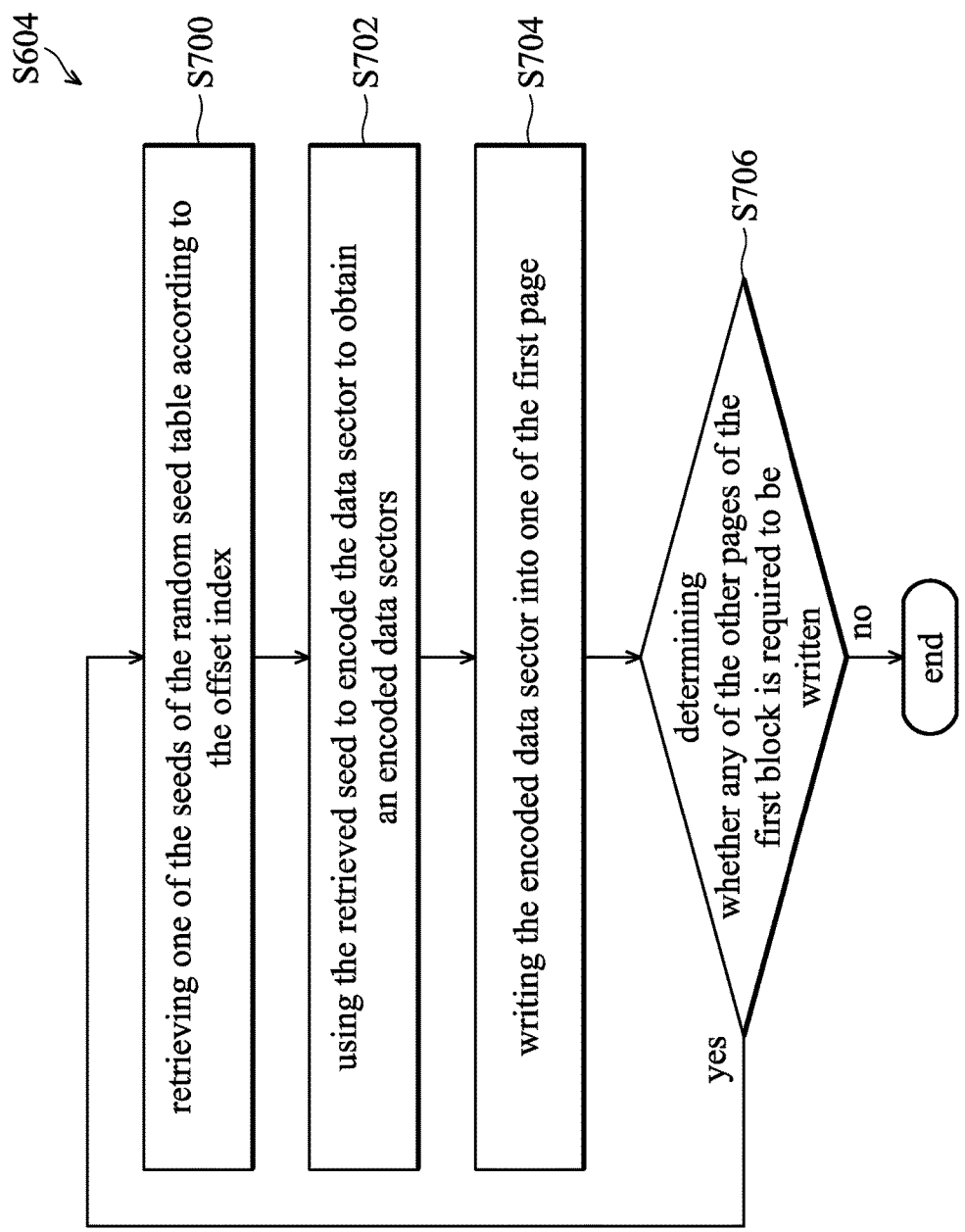
FIG. 7 is a flowchart of a data maintenance method constructed in accordance with some embodiments.

FIG. 7 is a flowchart of a data maintenance method constructed in accordance with some embodiments. The data maintenance method is applied to the data storage device 140 of FIG. 1. The process starts at step S700. It should be noted that the data maintenance method of FIG. 7 is the detailed steps of the step S604 of FIG. 6.

In step S700, the controller 160 retrieves one of the seeds RS_0~RS_N of the random seed table RST according to the offset index. More specifically, the seeds RS_0~RS_N are arranged in the random seed table RST in a predetermined order, as shown in FIG. 3. The controller 160 locates a target seed from the seeds RS_0~RS_N according to the offset index, and retrieves the seeds RS_0~RS_N starting from the target seed in the predetermined order. Every time step S700 is processed, a seed is retrieved in a predetermined order in which the seeds RS_0~RS_N are arranged in the random seed table.

Next, in step S702, the controller 160 uses the retrieved seed to encode the data sector to obtain an encoded data sectors.

Next, in step S704, the controller 160 writes the encoded data sector obtained in step S702 into the first page. It should be noted that one first page is arranged to store one encoded data sector. One seed is arranged to encode one data sector, and one the data sector is arranged to be stored in one first page. In one embodiment, the data sectors are the same while the seeds RS_0~RS_N are different from each other and the encoded data sectors are different from each other.

Next, in step S706, the controller 160 determines whether any of the other pages of the first block is required to be written. When the controller 160 determines that at least one of the page of the first block needs to be written, the process returns to step S700, otherwise, the process ends at step S706. Taking FIG. 4 as an example, the controller 160 obtains "2" as the offset index OFS by the hash algorithm. Next, in step S700, the controller 160 locates the seed RS2 from the random seed table RST according to the offset index OFS and serves the seed RS2 as the target seed. Next, the controller 160 retrieves the seed RS2 to encode the data sector DS (step S702), and writes the encoded data sectors ECD2 produced by the seed RS2 and data sector DS into the page P0 of the block B0 (step S704). The process returns to step S700 (because the pages P1~P7 still needs to be written), the controller 160 retrieves the next seed RS3 based on the predetermined order in which the seeds RS0~RS7 are arranged, and the controller 160 uses the seed RS3 to encode the data sector DS again (step S702), and writes the encoded data sectors ECD3 produced by the seed RS3 and data sector DS into the page P1 of the block B0 (step S704). The process returns to step S700 (because the pages P2~P7 still needs to be written), the controller 160 retrieves the next seed RS4 based on the predetermined order in which the seeds RS0~RS7 are arranged, and the controller 160 uses the seed RS4 to encode the data sector DS again (step S702), and writes the encoded data sectors ECD4 produced by the seed RS4 and data sector DS into the page P2 of the block B0 (step S704), and so on, until the controller 160 uses the last seed RS7 of the random seed table RST to encode the data sector DS and writes the encoded data sectors ECD7 produced by the seed RS7 and data sector DS into the page P5 of the B0. The controller 160 continues to retrieve the first seed RS0 of the random seed table RST (step S700) to encode the data sector DS, and write the encoded data sectors ECD0 produced by the seed RS0 and data sector DS into the page P6 of the block B0 (step S702~S704). Next, the controller 160 repeatedly performs the above operations until all of the pages of the block B0 are written. It should be noted that the encoded data sectors ECD0~ECD7 are different from each other, because the encoded data sectors ECD0~ECD7 are encoded by different seeds RS0~RS7.

The data storage device and the data maintenance method can reduce the damaged page.

Data transmission methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
   a flash memory, comprising a plurality of blocks, wherein each of the blocks has a plurality of pages; and
   a controller, receiving a write command which is arranged to write a plurality of data sectors into a plurality of first pages of a first block of the blocks, calculating an offset index according to a first erase count of the first block, retrieving a plurality of seeds from a random seed table according to the offset index, encoding the data sectors by using the retrieved seeds to obtain a plurality of encoded data sectors, and writing the encoded data sectors into the first pages.

2. The data storage device as claimed in claim 1, wherein the controller records the number of times that each of the blocks has been erased, and the first erase count is the number of times that the first block has been erased.

3. The data storage device as claimed in claim 1, wherein the controller performs a hash algorithm using the first erase count to obtain the offset index.

4. The data storage device as claimed in claim 3, wherein divisor of the hash algorithm is the number of the pages in each of the blocks.

5. The data storage device as claimed in claim 1, wherein the seeds are arranged in the random seed table in a predetermined order, the controller locates a target seed from the seeds according to the offset index and retrieves the seeds starting from the target seed of the random seed table in the predetermined order to sequentially encode the data sectors.

6. The data storage device as claimed in claim 5, wherein each of the seeds is separately arranged to encode one of the data sectors, and each of the data sectors is separately stored in one of the first pages.

7. The data storage device as claimed in claim 6, wherein the data sectors are the same while the seeds are different from each other and the encoded data sectors are different from each other.

8. A data storage device, comprising:
   a flash memory, comprising a plurality of blocks, and each of the blocks has a plurality of pages; and
   a controller, repeatedly writing a data sector into the pages of the blocks, wherein when the controller performs a write operation on a first block of the blocks, the controller calculates an offset index according to the number of times that the first block has been erased, encodes the data sector to produce a plurality of encoded data sectors according to the offset index, and writes the encoded data sectors into the first pages of the first block.

9. The data storage device as claimed in claim 8, further comprising a random seed table, and the random seed table comprises a plurality of seeds arranged in a predetermined order, wherein the controller locates a target seed in the random seed table according to the offset index to encode the data sector.

10. The data storage device as claimed in claim 8, wherein the controller receives the seeds of the random seed table starting from the target seed in the predetermined order for using the retrieved seed to encode the data sector, wherein each of the seeds is arranged to encode the data sector to produce one of the encoded data sectors, the encoded data sectors are different from each other, and each first page is arranged to store one of the encoded data sectors.

11. The data storage device as claimed in claim 8, wherein the controller further performs a hash algorithm by using the first erase count to obtain the offset index.

12. The data storage device as claimed in claim 11, wherein divisor of the hash algorithm is the number of the pages in each of the blocks.

13. A data maintenance method, applied to a data storage device, wherein the data storage device has a plurality of blocks, each of the blocks has a plurality of pages, and the data maintenance method comprises:
   receiving a write command which is arranged to write a plurality of data sectors into a plurality of first pages of a first block of the blocks;
   reading a first erase count of the first block to calculate an offset index according to the first erase count;
   retrieving a plurality of seeds from a random seed table according to the offset index for obtaining a plurality of encoded data sectors by using the retrieved seeds to encode the data sectors; and
   writing the encoded data sectors into the first pages.

14. The data maintenance method as claimed in claim 13, wherein the first erase count is the number of times that the first block has been erased.

15. The data maintenance method as claimed in claim 13, wherein the step of calculating an offset index according to the first erase count further comprises performing a hash algorithm by using the first erase count to obtain the offset index.

16. The data maintenance method as claimed in claim 15, wherein divisor of the hash algorithm is the number of pages in each of the blocks.

17. The data maintenance method as claimed in claim 13, wherein the seeds are arranged in the random seed table in a predetermined order, and the step of retrieving the seeds from a random seed table according to the offset index for obtaining the encoded data sectors by using the retrieved seeds to encode the data sectors further comprises:
   locating a target seed from the seeds according to the offset index; and
   retrieving the seeds starting from the target seed in the predetermined order to encode the data sectors by the retrieved seed.

18. The data maintenance method as claimed in claim 17, wherein each of the seeds is separately arranged to encode one of the data sectors, and each of the data sectors is separately stored in one of the first pages.

19. The data maintenance method as claimed in claim 18, wherein the data sectors are the same while the seeds are different from each other and the encoded data sectors are different from the each other.

20. A data maintenance method, applied in a data storage device, wherein the data storage device has a plurality of blocks, and each of the blocks has a plurality of pages, the data maintenance method comprises:
   receiving a write command which is arranged to repeatedly write a data sector into a plurality of first pages of a first block of the blocks;
   reading a first erase count of the first block in response to the write command to obtain the number of times that the first block has been erased;
   calculating an offset index according to the number of times that the first block has been erased;
   encoding the data sector according to the offset index to produce a plurality of encoded data sectors; and
   writing the encoded data sectors into the first pages of the first block, sequentially.

21. The data maintenance method as claimed in claim 20, wherein the step of encoding the data sector according to the offset index to produce the encoded data sectors further comprises locating a target seed in a random seed table according to the offset index for encoding the data sector, wherein the random seed table has a plurality of seeds arranged in the predetermined order.

22. The data maintenance method as claimed in claim 21, wherein the step of encoding the data sector according to the offset index to produce the encoded data sectors further comprises retrieving the seeds starting from the target seed in the predetermined order to use the retrieved seed to encode the data sector, wherein each of the seeds is arranged to encode the data sector to produce one of the encoded data sectors, the encoded data sectors are different from each other, and one of the first pages is arranged to store one of the encoded data sectors.

23. The data maintenance method as claimed in claim 20, wherein the step of calculating the offset index according to the number of time that the first block has been erased comprises performing a hash algorithm by using the first erase count to obtain the offset index.

24. The data maintenance method as claimed in claim 23, wherein divisor of the hash algorithm is the number of the pages in each of the blocks.

* * * * *